July 29, 1941.    J. CONNERS    2,250,823
TRAP
Filed Oct. 1, 1940    2 Sheets-Sheet 1
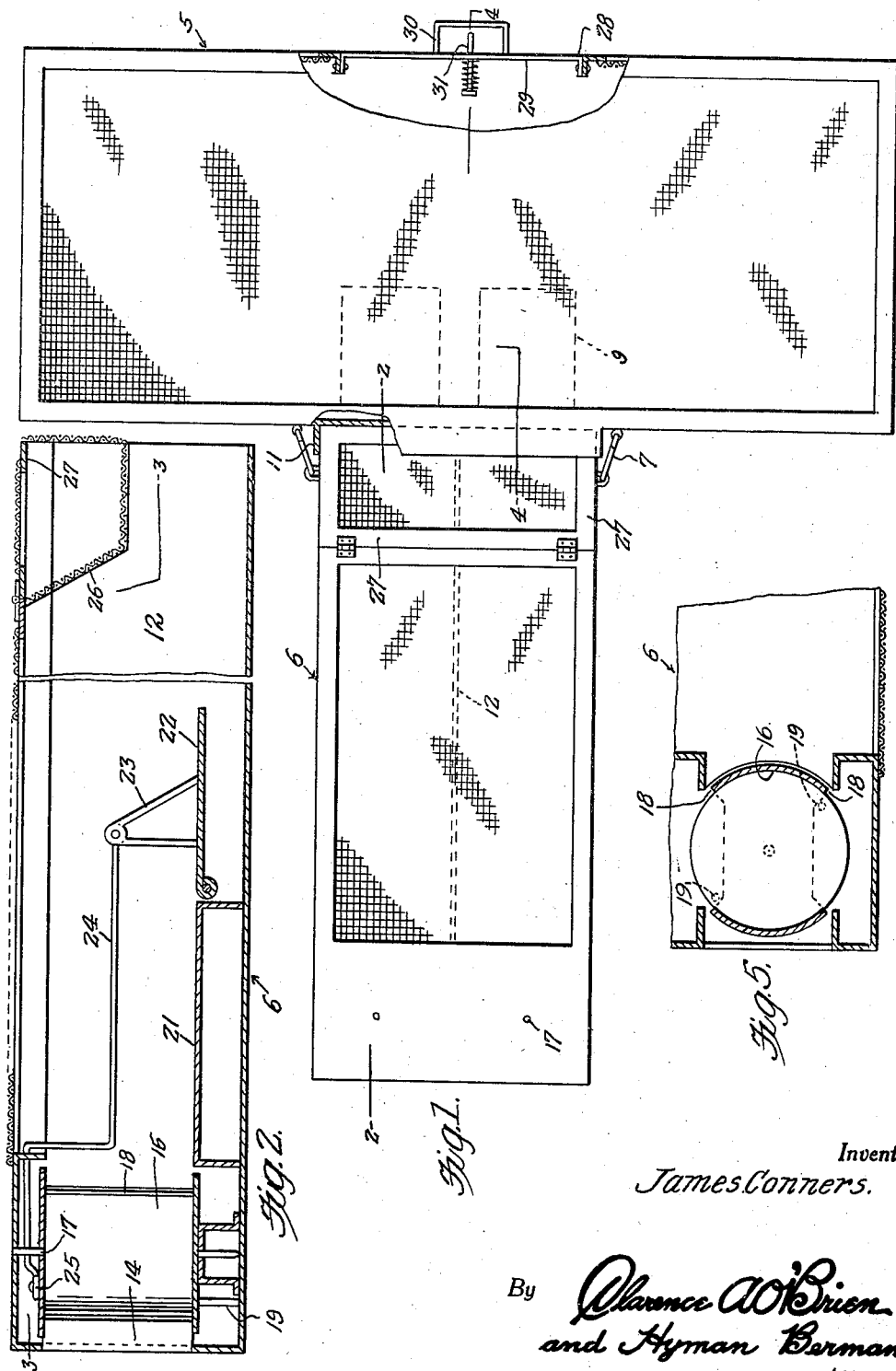
Inventor
James Conners.
By Clarence A. O'Brien
and Hyman Berman
Attorneys July 29, 1941. J. CONNERS 2,250,823
TRAP
Filed Oct. 1, 1940 2 Sheets-Sheet 2
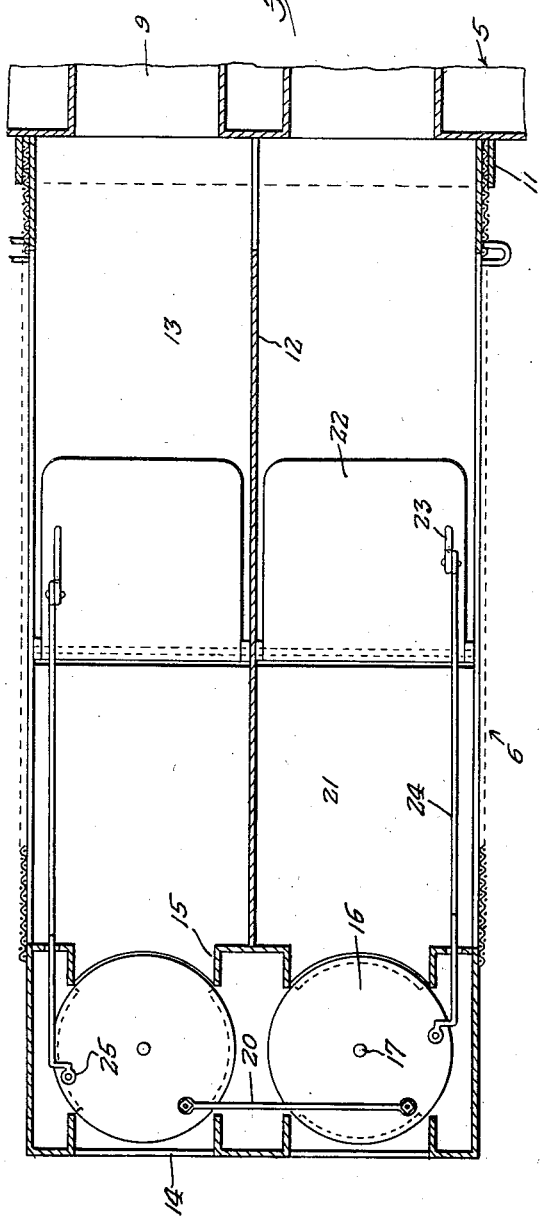
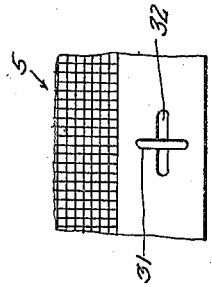
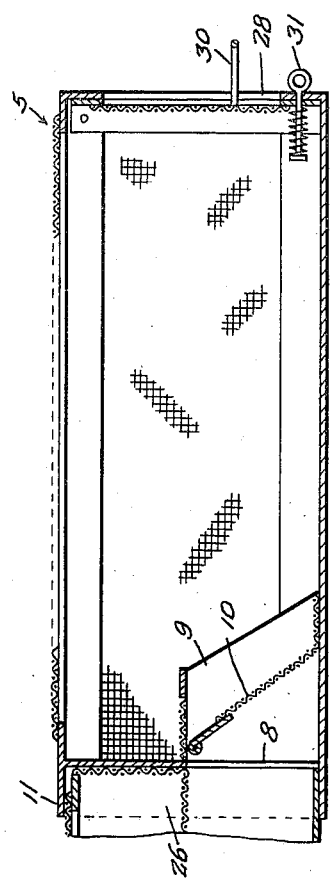
Inventor
James Conners.
By Clarence A. O'Brien
and Hyman Berman
Attorneys Patented July 29, 1941

2,250,823

UNITED STATES PATENT OFFICE 2,250,823

TRAP

James Conners, Hemet, Calif.

Application October 1, 1940, Serial No. 359,275

6 Claims. (Cl. 43—67)

This invention relates to traps for catching alive rodents and other animals, and has for the primary object the provision of an efficient and inexpensive device of this character which remains operative or set when placed in use, so that any number of rodents or other animals may be caught and manually removed alive and uninjured either for destruction or to be kept alive for any purpose desired.

Another object of this invention is the provision of a device of the above stated character which will be automatically set by the trapping thereof of each animal and having means for bait wherein the bait will be so positioned as to readily attract animals into the device and still be unattainable by the animals, so that the rebaiting of the trap will only be necessary when the bait has deteriorated from natural causes.

With these and other objects in view, the invention consists in certain novel features of construction, combination and arrangement of parts to be hereinafter more fully described and claimed.

For a complete understanding of my invention, reference is to be had to the following description and accompanying drawings, in which—

Figure 1 is a top plan view, partly in section, illustrating a trap constructed in accordance with my invention.

Figure 2 is a sectional view taken on the line 2—2 of Figure 1.

Figure 3 is a sectional view taken on the line 3—3 of Figure 2.

Figure 4 is a transverse sectional view taken on the line 4—4 of Figure 1.

Figure 5 is a fragmentary horizontal sectional view illustrating one of the entrances and the rotatable door therefor.

Figure 6 is a fragmentary elevational view showing a fastener for securing an exit or animal removal door in a closed position.

Referring in detail to the drawings, the numeral 5 indicates one section of the trap and 6 a second section of the trap. The sections 5 and 6 are detachably connected, suitable fasteners 7 being employed for retaining the sections assembled together and which may be easily actuated to permit separation of the sections whenever desired.

The section 5 forms a cage, preferably of a metallic frame construction, the vertical and top walls thereof being constructed of metallic foraminous material. The cage section 5 is arranged at right angles to the section 6, as clearly shown in Figure 1, and in one of its vertical walls is provided with doorways 8 each including a frame construction 9 arranged inwardly of the cage section and pivotally mounted therein is a gravity actuated door 10 partly constructed of solid material and partly of foraminous material, as clearly shown in Figure 4. The doors 10 are of the trap type normally assuming doorway-closing position by gravity and may be readily pushed open by an animal attempting to enter the cage section.

The section 6 is of elongated formation and preferably constructed of a metallic skeleton frame, the vertical and top walls thereof being composed of metallic foraminous material. One end of the section 6 is fully open and is received within flanges 11 formed on the cage section to bring the open end of the section 6 in direct communication with the doorways 8 of the cage section 5, the section 6 being held in the flanges 11 by the fasteners 7.

The section 6 is divided by a longitudinally arranged partition 12 forming in the section 6 non-communicating runways 13 each having an end in communication with the doorway 8 while the opposite end is in the form of an entrance 14.

Associated with the entrances 14 inwardly of the section 6 are door frames 15 of a construction to accommodate rotatable doors 16 each of cylindrical shape and including end walls of disc shape, as clearly shown in Figure 3. The doors 16 are arranged vertically being rotatably supported in this position by upper and lower pintles 17 journaled in the frame construction of the section 6. The doors 16 are provided in the vertical walls thereof with oppositely arranged openings 18 so that when the doors are in one position passages 13 will be opened to the entrances 14 and when in another position the passages will be closed to the entrances.

It is to be understood that the doors 16 are arranged to rotate in opposite directions and stop pins 19 are provided for the limiting of the rotation of said doors in opposite directions so that the doors will not move beyond entrance opening and closing positions. Also the doors are so arranged that one of the passageways 13 is open to its entrance 14 while the other passageway is closed to its entrance. Therefore, it will be understood that the passageways are alternatingly opened and closed to the entrances 14, one passageway always being open to its entrance while the other passageway is closed to its entrance.

A link 20 is pivotally connected to the top walls of the doors 16 to bring about simultaneous rotation of said doors. The pivotal connection of the link 20 on the doors is located eccentrically of the axis of rotation of said doors.

False bottoms 21 are arranged in the runways 13, being in a plane substantially with the plane of the bottom walls of the doors. The false bottoms 21 extend a limited distance from the doors toward the open ends of the runways 13 and pivotally mounted in said passageways or runways 13 are treadles 22, the pivots of said treadles being in a plane substantially with the plane of the top faces of the false bottoms so that the treadles may swing downwardly when under the weight of an animal. The treadles 22 are provided with brackets 23 to which are pivotally connected operating rods 24. The operating rods are slidably supported in the frame construction of the section 6 and are pivotally connected to the top walls of the doors 16, as shown at 25 and contain a sufficient flexibility so that they may flex to follow the pivotal movement of the treadles. The pivotal connections 25 are arranged off-center from the axis of rotation of the doors. The pivots 25 are also so arranged on the doors that when one of the doors is in entrance opening position the treadle connected thereto will be in an elevated position and the other treadle will be in a lowered position while its door is in entrance closing position.

A bait chamber 26, constructed of foraminous material, is arranged in the section 6 at the open end thereof and includes a hinged door 27 which will permit access to the bait chamber from the exterior of the section 6 so that bait may be readily placed therein. The bait chamber supports the bait within the inner ends of the runways 13 for the purpose of attracting into whichever runway which may be open to its entrance a rodent or animal and as the latter moving toward the bait chamber steps on the treadle of the runway in which he is located brings about operation of the doors, the door of the passage which is occupied by the animal assumes entrance-closing position while the other door assumes entrance-opening position and the treadle connected thereto is moved thereby into elevated position, consequently the animal becomes trapped in the runway and in order to escape therefrom shoves open the door 10 opposite to said runway and enters the cage and becomes trapped therein. Thus it will be seen that the other runway is then opened ready for the entrance of the next animal. By referring to Figure 3 it will be seen that one of the doors is in entrance-closing position and the other door is in entrance-opening position. The vertical walls of the doors are shown by dotted lines in Figure 3, also said dotted lines indicate which door is open and which door is closed and further it is to be understood that when an animal passes through the open door and steps upon the treadle connected to said door the other door is swung into an open position by the first-mentioned door assuming an entrance-closing position. Consequently the next animal may then enter the other runway and step upon the treadle therein which again reverses the position of the door resetting the trap whereby a third animal may enter the doors through which the first animal passed.

The vertical side of the cage section 5 opposite to the doors 10 is provided with a doorway 28 normally closed by a door 29 equipped with a handle 30. A spring influenced latch 31 operating in a slot 32 is employed for retaining the door 29 in a closed position against accidental opening. The door 29 is employed for removing the rodents or animals from the cage when desired.

It is believed that the simplicity and advantages of this invention will be perfectly apparent to those skilled in the art to which such device relates, and while I have herein set forth a satisfactory embodiment of the invention it is to be understood that such changes therefrom as fairly fall within the scope of the claims may be resorted to when desired.

Having thus described my invention, what I claim is:

1. A trap comprising a cage section and an entrance section, trap doors between said sections and normally closing the entrance section to the cage section and operable under the influence of an animal, said entrance section including passageways, rotatable and vertically arranged doors for alternatingly opening and closing said passageways, to the exterior of the entrance section, animal influenced means in the passageways for effecting simultaneous and alternate operation of said doors, and a bait chamber arranged in said passageways between the cage section and said means.

2. A trap comprising a cage section and an entrance section having communication with each other and said entrance section including a pair of passageways, trap doors controlling said passageways to the cage section, a bait chamber arranged in the entrance section adjacent said doors, said entrance section having doorways one for each passageway thereof, rotatable doors for controlling said doorways, means for connecting said doors for operation in unison, and animal influenced means in the passageways and connected to said doors to bring about operation of said doors whereby the doors will be caused to assume alternating open and closed positions.

3. A trap comprising a cage section and an entrance section having communication with each other and said entrance section including a pair of passageways, trap doors controlling said passageways to the cage section, a bait chamber arranged in the entrance section adjacent said doors, said entrance section having doorways one for each passageway thereof, rotatable doors for controlling said doorways, means for connecting said doors for operation in unison, treadles pivotally mounted in the passageways of the entrance section, connecting rods connecting said treadles to said doors for the alternate operation of the doors.

4. A trap comprising a cage section and an entrance section having communication with each other and said entrance section including a pair of passageways, trap doors controlling said passageways to the cage section, a bait chamber arranged in the entrance section adjacent said doors, said entrance section having doorways one for each passageway thereof, rotatable doors for controlling said doorways, means for connecting said doors for operation in unison, treadles pivotally mounted in the passageways of the entrance section, connecting rods connecting said treadles to said doors for the alternate operation of the doors, and false bottoms arranged between the doors and the treadles.

5. A trap comprising a cage section and an entrance section including walls of foraminous material, said sections being separable and detachably connected and the cage section having doorways with the entrance section connecting thereto, flanges formed on the cage section and receiving therein one end of the entrance section to align the latter with the doorways, trap doors of the gravity actuated type normally closing said doorways and operable under the influence of an animal to enter the cage section from the entrance section, said entrance section including passages having entrances, rotatable doors for controlling said entrances, means for limiting the rotation of the doors in opposite directions, a connecting means between said doors, pivotally mounted treadles in said passageways, and connecting rods pivotally connected to the doors and to the treadles.

6. A trap comprising a cage section and an entrance section including walls of foraminous material, said sections being separable and detachably connected and the cage section having doorways with the entrance section connecting thereto, flanges formed on the cage section and receiving therein one end of the entrance section to align the latter with the doorways, trap doors of the gravity actuated type normally closing said doorways and operable under the influence of an animal to enter the cage section from the entrance section, said entrance section including passages having entrances, rotatable doors for controlling said entrances, means for limiting the rotation of the doors in opposite directions, a connecting means between said doors, pivotally mounted treadles in said passageways, connecting rods pivotally connected to the doors and to the treadles, a foraminous bait compartment arranged in the entrance section adjacent the end thereof having communication with the doorways and provided with a door to give access to the bait compartment from the exterior of the entrance section.

JAMES CONNERS.